(12) United States Patent
Jeong et al.

(10) Patent No.: US 11,627,850 B2
(45) Date of Patent: Apr. 18, 2023

(54) WHEEL ASSEMBLY AND ROBOT CLEANER HAVING SAME

(71) Applicant: Samsung Electronics Co., Ltd., Suwon-si (KR)

(72) Inventors: Jae Youl Jeong, Suwon-si (KR); Dong Wook Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 12 days.

(21) Appl. No.: 17/365,302

(22) Filed: Jul. 1, 2021

(65) Prior Publication Data

US 2021/0321842 A1 Oct. 21, 2021

Related U.S. Application Data

(63) Continuation of application No. 15/767,255, filed as application No. PCT/KR2016/013214 on Nov. 16, 2016, now Pat. No. 11,083,353.

(30) Foreign Application Priority Data

Nov. 20, 2015 (KR) .................. 10-2015-0163196

(51) Int. Cl.
  *A47L 9/00* (2006.01)
  *A47L 11/24* (2006.01)
  (Continued)

(52) U.S. Cl.
  CPC ............... *A47L 9/009* (2013.01); *A47L 11/24* (2013.01); *A47L 11/4069* (2013.01);
  (Continued)

(58) Field of Classification Search
  CPC ...... A47L 9/009; A47L 11/24; A47L 11/4069; A47L 11/4072; A47L 9/00; A47L 9/2884;
  (Continued)

(56) References Cited

U.S. PATENT DOCUMENTS

2005/0027396 A1 2/2005 Yang et al.
2013/0054026 A1 2/2013 Jang
(Continued)

FOREIGN PATENT DOCUMENTS

CN 102949149 A 3/2013
GB 2497452 A 6/2013
(Continued)

OTHER PUBLICATIONS

International Search Report dated Mar. 24, 2017 in corresponding International Patent Application No. PCT/KR2016/013214.
(Continued)

*Primary Examiner* — Katina N. Henson
(74) *Attorney, Agent, or Firm* — Staas & Halsey LLP

(57) ABSTRACT

Disclosed herein are a wheel assembly and a robot cleaner including a main body and a wheel assembly coupled to the main body to guide movement of the main body. The wheel assembly has a rotation arm including a first end portion rotatably mounted on the main body, a drive wheel rotatably installed on a second end portion of the rotation arm opposite the first end portion, and an elastic member including a first end installed at the main body and a second end vertically moveably installed at the rotation arm opposite the first end, such that a reduction degree of a contact force due to a descent of the drive wheel.

15 Claims, 20 Drawing Sheets

(51) Int. Cl.
- *A47L 11/40* (2006.01)
- *A01D 34/00* (2006.01)
- *A01D 69/00* (2006.01)
- *A47L 9/28* (2006.01)

(52) U.S. Cl.
CPC .......... *A47L 11/4072* (2013.01); *A01D 34/00* (2013.01); *A01D 69/00* (2013.01); *A47L 9/00* (2013.01); *A47L 9/2884* (2013.01); *A47L 2201/00* (2013.01); *A47L 2201/04* (2013.01); *A47L 2201/06* (2013.01)

(58) Field of Classification Search
CPC ............. A47L 2201/00; A47L 2201/04; A47L 2201/06; A01D 34/00; A01D 69/00
USPC ...................... 15/319, 340.1, 300.1; 700/245
See application file for complete search history.

(56) References Cited

U.S. PATENT DOCUMENTS

| | | | |
|---|---|---|---|
| 2013/0056290 A1 | 3/2013 | Lee et al. | |
| 2013/0340201 A1 | 12/2013 | Jang et al. | |
| 2016/0015232 A1* | 1/2016 | Nakamura | H01T 23/00 280/124.179 |

FOREIGN PATENT DOCUMENTS

| | | |
|---|---|---|
| KR | 10-2004-0096253 | 11/2004 |
| KR | 10-2009-0129029 | 12/2009 |
| KR | 10-2013-0021211 | 3/2013 |
| KR | 10-20113-0021211 | 3/2013 |
| KR | 10-2014-0000811 | 1/2014 |
| WO | 2014/192332 | 12/2014 |

OTHER PUBLICATIONS

Written Opinion of the International Searching Authority dated Mar. 24, 2017 in corresponding International Patent Application No. PCT/KR2016/013214.
Extended European Search Report dated Oct. 17, 2018 from European Patent Application No. 16866647.7, 7 pages.
U.S. Office Action dated Mar. 31, 2020 from U.S. Appl. No. 15/767,255.
Chinese Office Action dated Mar. 5, 2020 from Chinese Patent Application No. 201680067252.3, 16 pages.
U.S. Office Action dated Jun. 26, 2020 from U.S. Appl. No. 15/767,255.
U.S. Advisory Action dated Sep. 3, 2020 from U.S. Appl. No. 15/767,255.
U.S. Office Action dated Oct. 14, 2020 from U.S. Appl. No. 15/767,255.
U.S. Notice of Allowance dated Mar. 29, 2021 from U.S. Appl. No. 15/767,255.
Korean Office Action dated Aug. 25, 2021 from Korean Application No. 10-2015-0163196.
Australian Office Action dated Jul. 5, 2021 from Australian Application No. 2016356448.
Korean Office Action dated Jan. 6, 2022 from Korean Application No. 10-2015-0163196.
Australian Office Action dated Oct. 26, 2021 from Australian application No. 2016356448.
Australian Office Action dated Dec. 20, 2021 from Australian application No. 2016356448.

* cited by examiner

WHEEL ASSEMBLY AND ROBOT CLEANER HAVING SAME

CROSS-REFERENCE TO RELATED APPLICATIONS

This application is a Continuation Application of U.S. application Ser. No. 15/767,255, filed Apr. 10, 2018 which is a National Phase Application under U.S.C. § 371 of PCT International Patent Application No. PCT/KR2016/013214, filed Nov. 16, 2016 which claims the foreign priority benefit under 35 U.S.C. § 119 to Korean Patent Application No. 10-2015-0163196 filed Nov. 20, 2015, the contents of which are incorporated herein by reference.

TECHNICAL FIELD

The present disclosure relates to a wheel assembly and a robot cleaner having the same, and more particularly, to a structural improvement for a contact force of a drive wheel.

BACKGROUND ART

Generally, robot cleaners are devices configured to automatically travel in a region to be cleaned according to a preset program to suction foreign materials such as dust from a ground surface and to clean the region without a user's manipulation.

Such a robot cleaner includes a drive wheel for driving a main body of a robot cleaner, and the drive wheel drives the main body of the robot cleaner using a frictional force generated between the drive wheel and a ground surface in contact with the drive wheel.

A force applied to the drive wheel toward the ground surface is needed to generate the frictional force, and the force relates to a contact force of the robot cleaner.

A robot cleaner has to maintain a predetermined contact force of a drive wheel regardless of a state or condition of a ground surface to have predetermined traveling performance on a floor such as a hard floor or carpet having differences in various floor conditions and heights.

Conventionally, although an elastic member, such as a tension coil spring, is used to press a drive wheel against a ground surface, since an elastic force of the elastic member is changed according to a displacement of the drive wheel when a robot cleaner is used on a ground surface having a height difference, a difference in magnitude of a force pressing the drive wheel occurs, and accordingly, there is a problem in that a contact force of the drive wheel is decreased.

DISCLOSURE

Technical Problem

The present disclosure is directed to a wheel assembly improved to decrease a change in a contact force of a drive wheel even in a case in which there is a change in a displacement of the drive wheel when a robot cleaner travels on a ground surface having a height difference, and a robot cleaner having the same.

Technical Solution

In accordance with one aspect of the present disclosure to provide a robot cleaner including a main body, and a wheel assembly coupled to the main body and configured to guide movement of the main body, wherein the wheel assembly includes a rotation arm including a first end portion rotatably installed in the main body; a drive wheel rotatably installed at a second end portion of the rotation arm opposite the first end portion, and an elastic member including a first end installed at the main body and a second end vertically moveably installed at the rotation arm opposite the first end.

The rotation arm may include a guide configured to vertically extend from the first end portion and the second end of the elastic member is moveably installed at the guide.

The guide may include a guide portion configured to guide movement of the first end of the elastic member, and a pair of stoppers provided at upper and lower ends of the guide portion and configured to restrict movement of the second end of the elastic member.

The elastic member may include an elastic portion formed in a coil form, a first hook supported by the main body, and a second hook supported by the guide portion.

The robot cleaner may further include a moving bush formed in an arc shape and moveably installed at the guide portion, wherein the moving bush includes a seating groove which is provided in a circumferential direction and in which the second hook is seated.

The robot cleaner may further include a roller moveably installed on the guide portion, wherein the second hook is connected to the roller.

The robot cleaner may further include a bearing installed at a center of the roller, and a holder including both ends coupled to the bearing by a shaft, wherein the first hook is supported by the holder.

The guide portion may be formed in a linear shape.

The guide portion may include two line sections obliquely connected to form an obtuse angle.

The guide portion may be formed in a concavely curved shape.

The robot cleaner may further include a pinion moveably installed on the guide portion formed as a rack gear, and a holder having both ends coupled to the pinion by a shaft, wherein the second hook is supported by the holder.

The guide portion may be formed in an inner gear form.

The wheel assembly may be provided with a pair of wheel assemblies coupled to both sides of the main body.

In accordance with an another aspect of the present disclosure to provide a wheel assembly including a wheel housing, a drive wheel disposed movably downwardly in the wheel housing, a rotation arm rotatable about a first end portion thereof and having a second end portion opposite to the first end portion on which the drive wheel, and an elastic member having a first end provided on the wheel housing and a second end provided on the opposite side of the first end to be vertically movable on the rotation arm.

In accordance with an another aspect of the present disclosure to provide a method of operating a wheel assembly including a rotation arm having a first end portion rotatably installed at a moving object, a drive wheel rotatably installed at a second end portion of the rotation arm opposite the first end portion, and an elastic member having a first end installed at the object and a second end disposed opposite the first end and vertically moveably installed at the rotation arm, the method including rotating the rotation arm about the first end portion, moving the drive wheel disposed at the second end portion of the rotation arm downward, and moving the second end of the elastic member upward according to the downward movement of the drive wheel.

A guide configured to guide the movement of the second end of the elastic member is provided at the first end portion of the rotation arm, and an angle between the elastic member and the guide is gradually changed from an obtuse angle to an acute angle according to the downward movement of the drive wheel.

Advantageous Effects

As described above, in a wheel assembly and a robot cleaner having the same, since a drive wheel is moved downward according to rotation of a rotation arm, a position of a second end of an elastic member is away from a rotation center of the rotation arm, a torque applied to the rotation arm is increased such that a reduction degree of a contact force of the drive wheel due to a reduction of an elastic restoring force of the elastic member is decreased.

MODES OF THE DISCLOSURE

Hereinafter, embodiments of the present disclosure will be described in detail with reference to the accompanying drawings.

Figure 1:
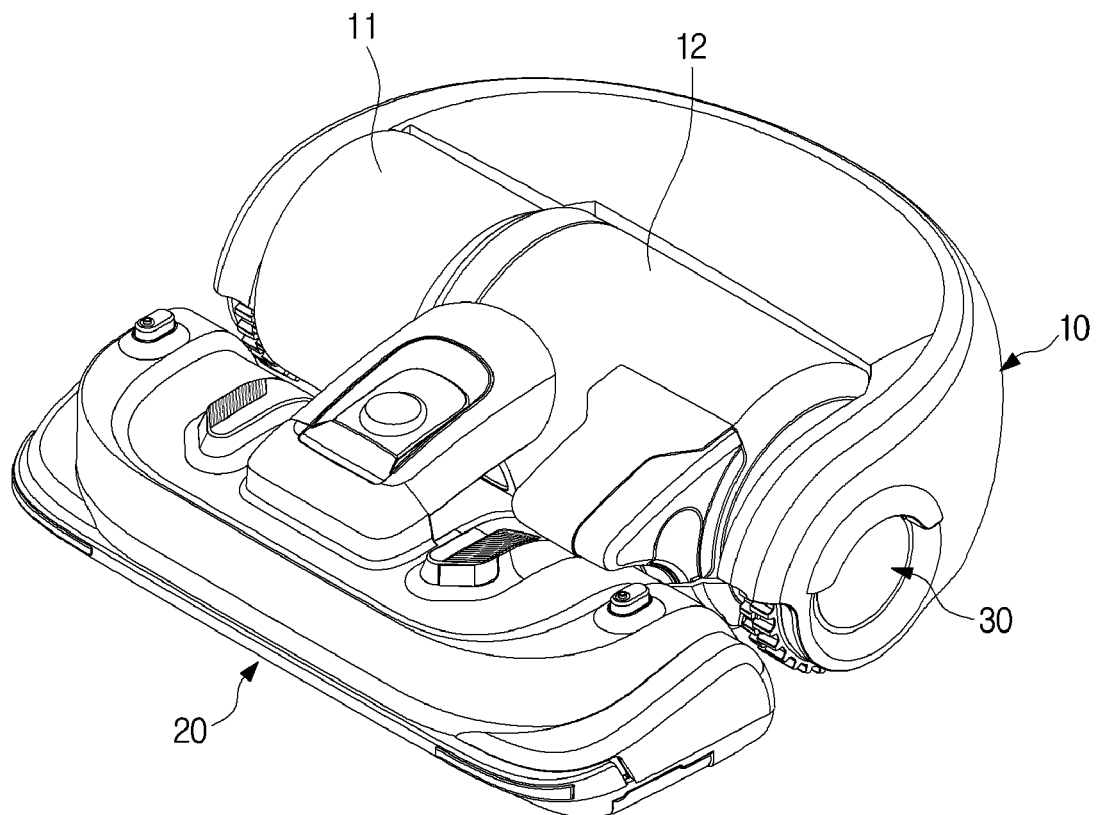
FIG. 1 is a perspective view illustrating a robot cleaner according to a first embodiment of the present disclosure.

FIG. 1 is a view illustrating a robot cleaner 1 according to a first embodiment of the present disclosure.

Figure 4:
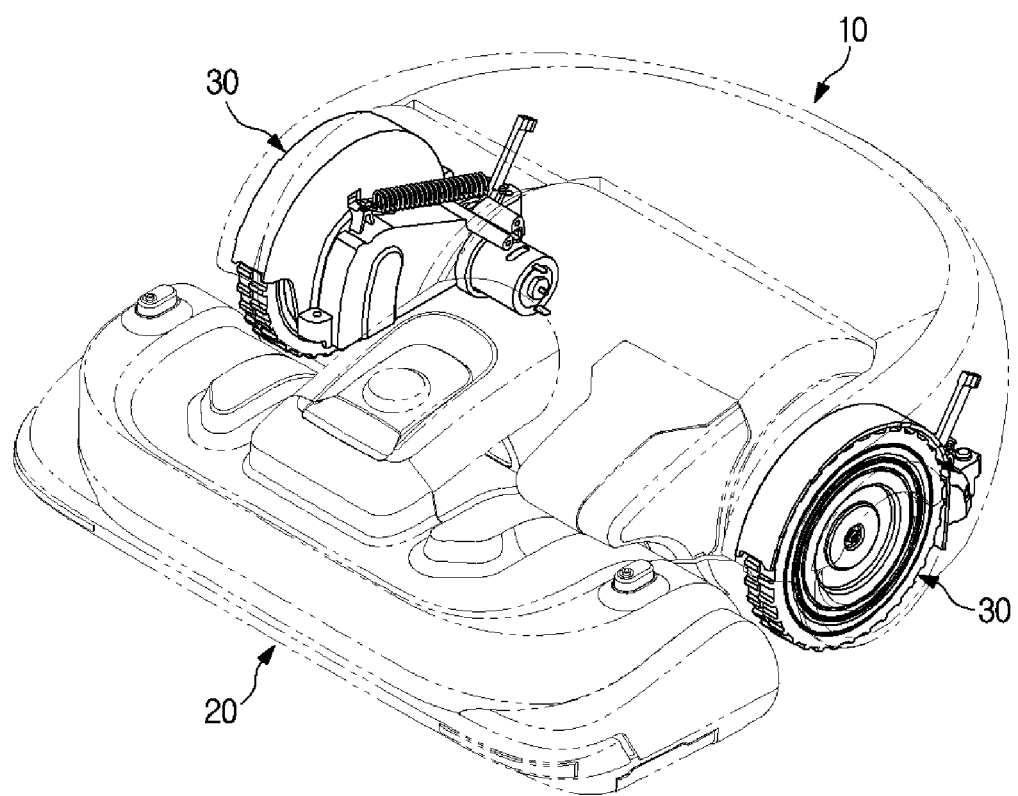
FIG. 4 is a perspective view illustrating an installation state of a wheel assembly in a robot cleaner according to the first embodiment of the present disclosure.

The robot cleaner 1 includes a main body 10 forming an exterior thereof, a suction unit 20 coupled to one side of the main body 10 and configured to suction air around a floor, and wheel assemblies 30 disposed at both sides of the main body 10 as illustrated in FIG. 4 and configured to allow the main body 10 to move on a ground surface.

Referring back to FIG. 1, the main body 10 includes a fan motor 11 configured to generate a suction force and a dust collecting container 12 configured to store foreign materials such as dust filtered from air suctioned through the suction unit 20.

The suction unit 20 suctions foreign materials of a ground surface with air using a suction force transmitted from the fan motor 11. Although not illustrated in the drawings, a brush is rotatably installed in the suction unit 20 to swipe dust on the ground surface upward.

Figure 2:
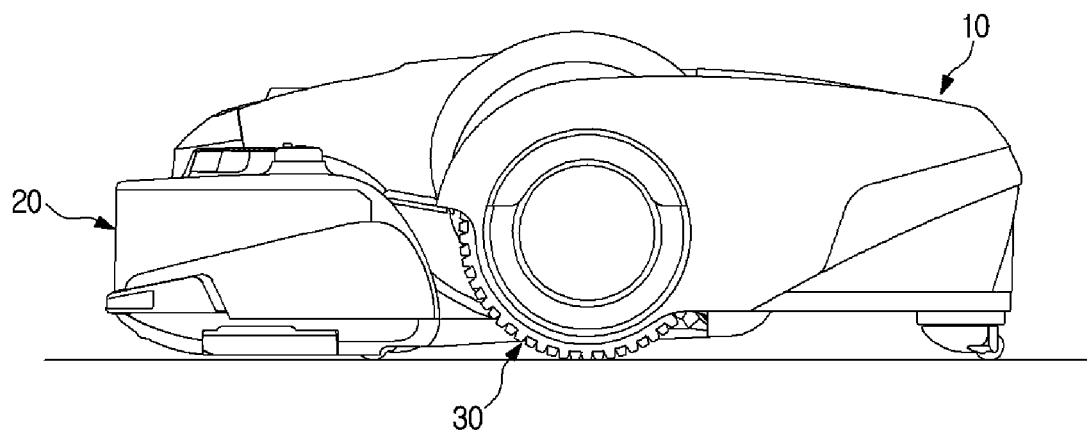
FIG. 2 is a view illustrating the robot cleaner according to the first embodiment of the present disclosure when the robot cleaner passes through a flat surface.
Figure 3:
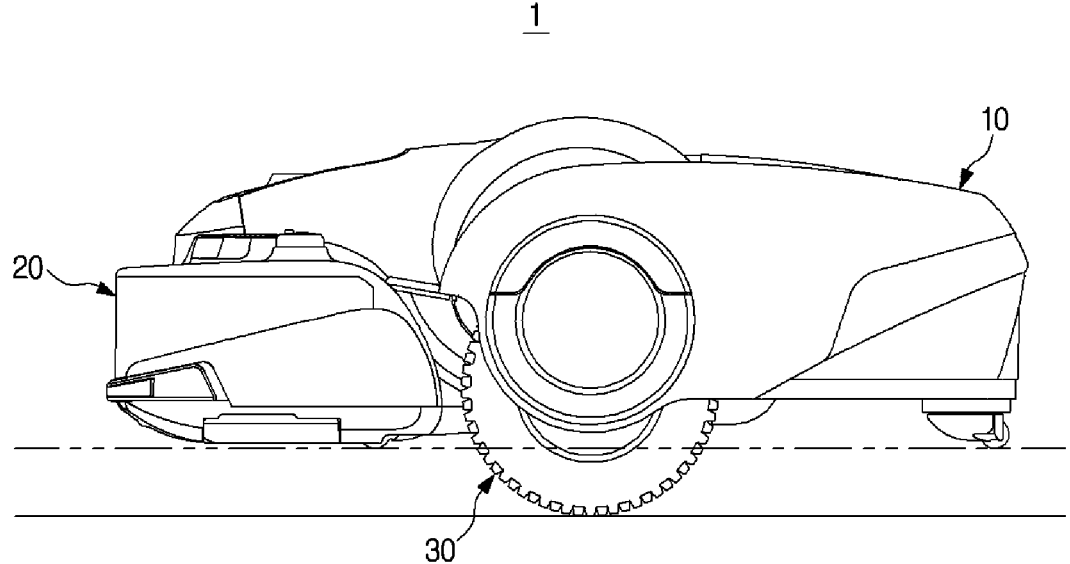
FIG. 3 is a view illustrating the robot cleaner according to the first embodiment of the present disclosure when the robot cleaner passes through a floor having a height difference.

In a case in which the robot cleaner 1 moves along a flat surface, the wheel assembly 30 maintains a state in which the main body 10 is adjacent to the ground surface, as illustrated in FIG. 2, and in a case in which the robot cleaner passes a place having a height difference such as a threshold, the wheel assembly 30 allows the main body 10 to be spaced apart from the ground surface, as illustrated I FIG. 3.

Figure 5:
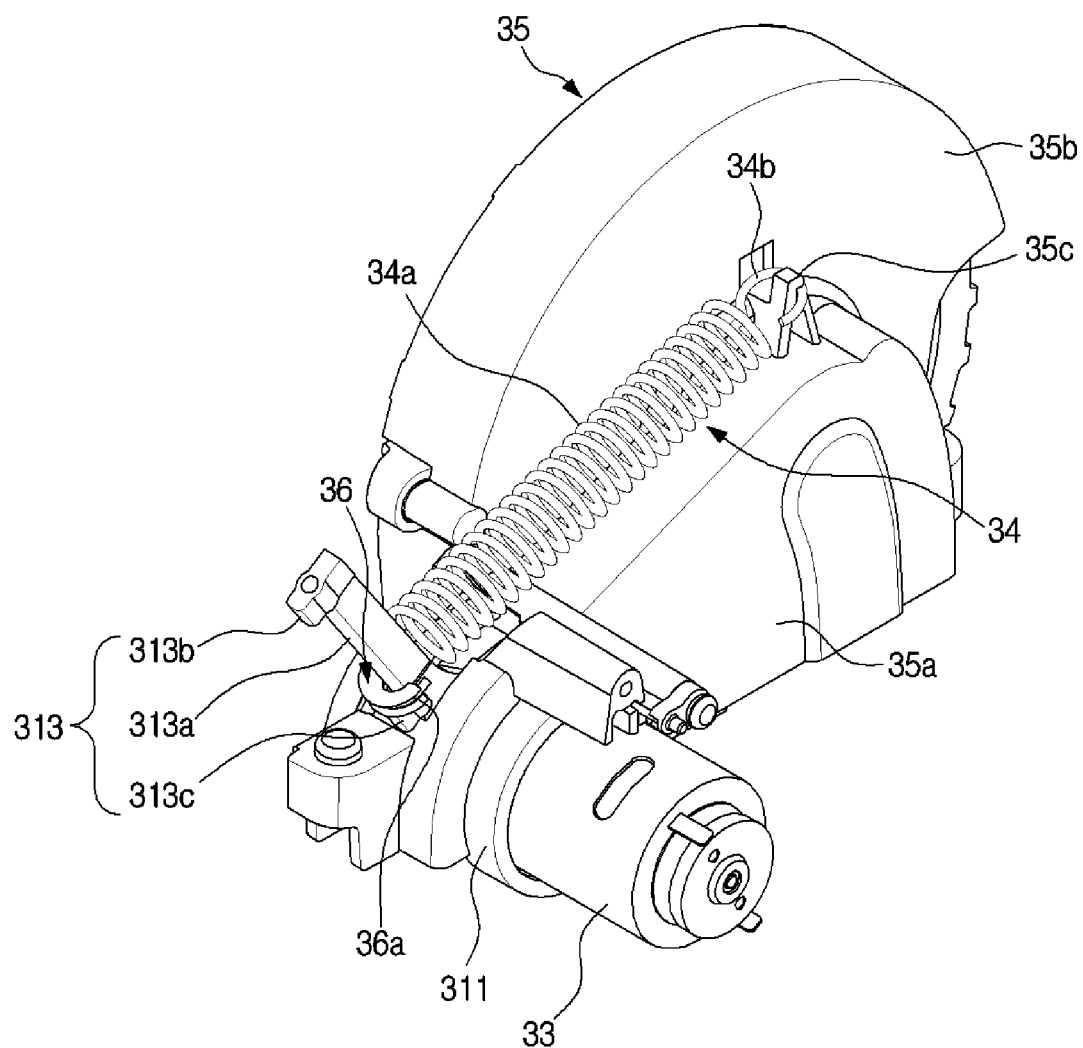
FIG. 5 is a perspective view illustrating the wheel assembly according to the first embodiment of the present disclosure.
Figure 6:
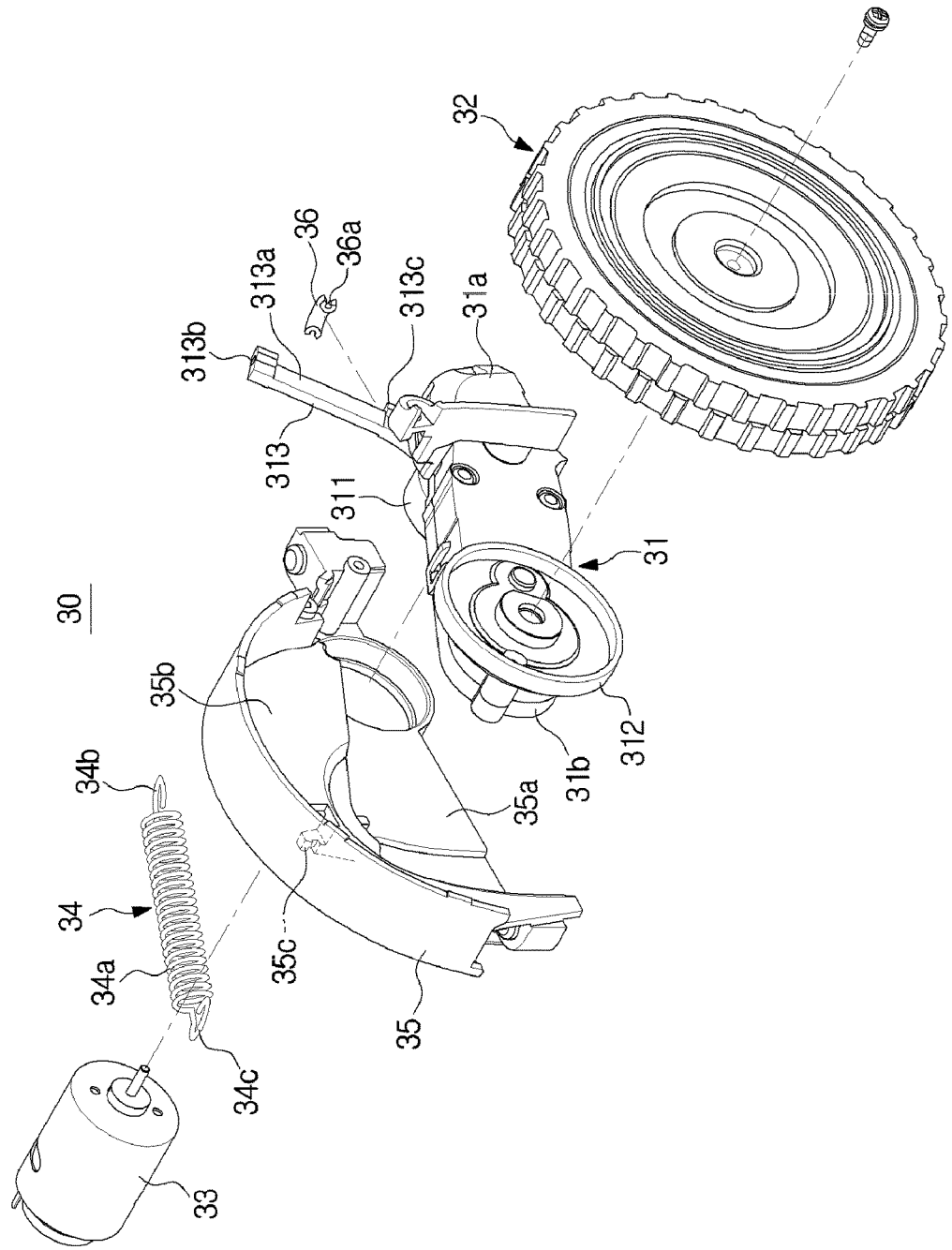
FIG. 6 is an exploded perspective view illustrating the wheel assembly according to a first embodiment of the present disclosure.

As illustrated in FIGS. 5 and 6, the wheel assembly 30 includes a rotation arm 31 having a first end portion 31a provided at one side thereof and rotatably installed in the main body 10, a drive wheel 32 installed at a second end portion 31b of the rotation arm 31 opposite the first end portion 31a, a drive motor 33 coupled to a side of the first end portion of the rotation arm 31 and configured to generate a rotational force for rotating the drive wheel 32, an elastic member 34 configured to elastically support the rotation arm 31 to maintain a predetermined contact force or more between the drive wheel 32 and a ground surface, and a wheel housing 35 configured to accommodate the drive wheel 32.

Since the first end portion 31a of the rotation arm 31 is rotatably installed at the main body 10 as described above, the second end portion 31b of the rotation arm 31 moves downward as the rotation arm 31 rotates about the first end portion 31a.

A motor installation portion 311 in which the drive motor 33 is installed is provided at the first end portion 31a of the rotation arm 31, and a wheel installation portion 312 in which the drive wheel 32 is installed is provided at the second end portion 31b of the rotation arm 31. In addition, a power transmission unit such as a belt or gear for transmitting the rotational force generated by the drive motor 33 to the drive wheel 32, is installed inside the rotation arm 31. Accordingly, as the second end portion 31b of the rotation arm 31 moves downward, the drive wheel 32 is moved downward.

The elastic member 34 is formed of a coil spring, a first end 34b of the elastic member 34 is hooked on and supported by a support 35c provided at the wheel housing 35, and a second end 34c of the elastic member 34 is supported by a guide 313 of the rotation arm 31. Accordingly, in a case in which a weight of the robot cleaner 1 applied to the drive wheel 32 decreases, the second end portion 31b of the rotation arm 31 and the drive wheel 32 installed at the second end portion 31b of the rotation arm 31 are moved downward due to an elastic restoring force of the elastic member 34.

The elastic member 34 includes an elastic portion 34a formed in a coil form and configured to generate the elastic force, a first hook 34b forming the first end 34b of the elastic member 34 and supported by the support 35c, and a second hook 34c forming the second end 34c of the elastic member 34 and supported by the guide 313 of the rotation arm 31. That is, the first hook 34b is the first end 34b of the elastic member 34 and the second hook 34c is the second end 34c of the elastic member 34.

The wheel housing 35 includes an arm accommodation portion 35a in which the rotation arm 31 is rotatably accommodated and a wheel accommodation portion 35b in which the drive wheel 32 is rotatably accommodated. In addition, the above-described support 35c is provided in the wheel housing 35.

Accordingly, while the robot cleaner 1 moves on a flat surface, a state in which the drive wheel 32 is accommodated in the wheel accommodation portion 35b due to the weight of the robot cleaner 1 is maintained, and when the robot cleaner 1 passes a place such as a threshold, since the weight of the robot cleaner 1 transmitted to the drive wheel 32 decreases, the rotation arm 31 rotates about the first end portion 31a while the elastic member 34 is elastically restored, and accordingly, the second end portion 31b of the rotation arm 31 and the drive wheel 32 installed at the second end portion 31b are moved downward.

As described above, since the elastic member 34 is gradually elastically restored as the drive wheel 32 moves downward, the contact force of the drive wheel 32 maintained due to the elastic restoring force of the elastic member 34 gradually decreases as the drive wheel 32 moves downward.

Since the second end 34c of the elastic member 34 is installed at the rotation arm 31 to be moveable upward and downward to decrease the amount of reduction of the contact force due to the descent of the drive wheel 32, the second end 34c of the elastic member 34 is moved upward according to the descent of the drive wheel 32.

The rotation arm 31 includes the guide 313 extending upward from the side of the first end portion 31a and configured to guide movement of the second end of the elastic member 34.

The guide 313 includes a guide portion 313a at which the second end of the elastic member 34 is vertically moveably installed and a pair of stoppers 313b and 313c provided at upper and lower ends of the guide portion 313a and configured to allow the second end of the elastic member 34 to move in the guide portion 313a. In the present disclosure, the guide portion 313a is substantially formed in a linear shape. Here, the guide portion 313a is designed such that an obtuse angle between the guide portion 313a and the elastic member 34s is maintained in a state in which the drive wheel 32 is accommodated in the wheel accommodation portion 35b, and an acute angle is formed between the guide portion 313a and the elastic member 34 when the drive wheel 32 protrudes from the wheel accommodation portion 35b by a predetermined degree or more as the rotation arm 31 gradually rotates.

Figure 7:
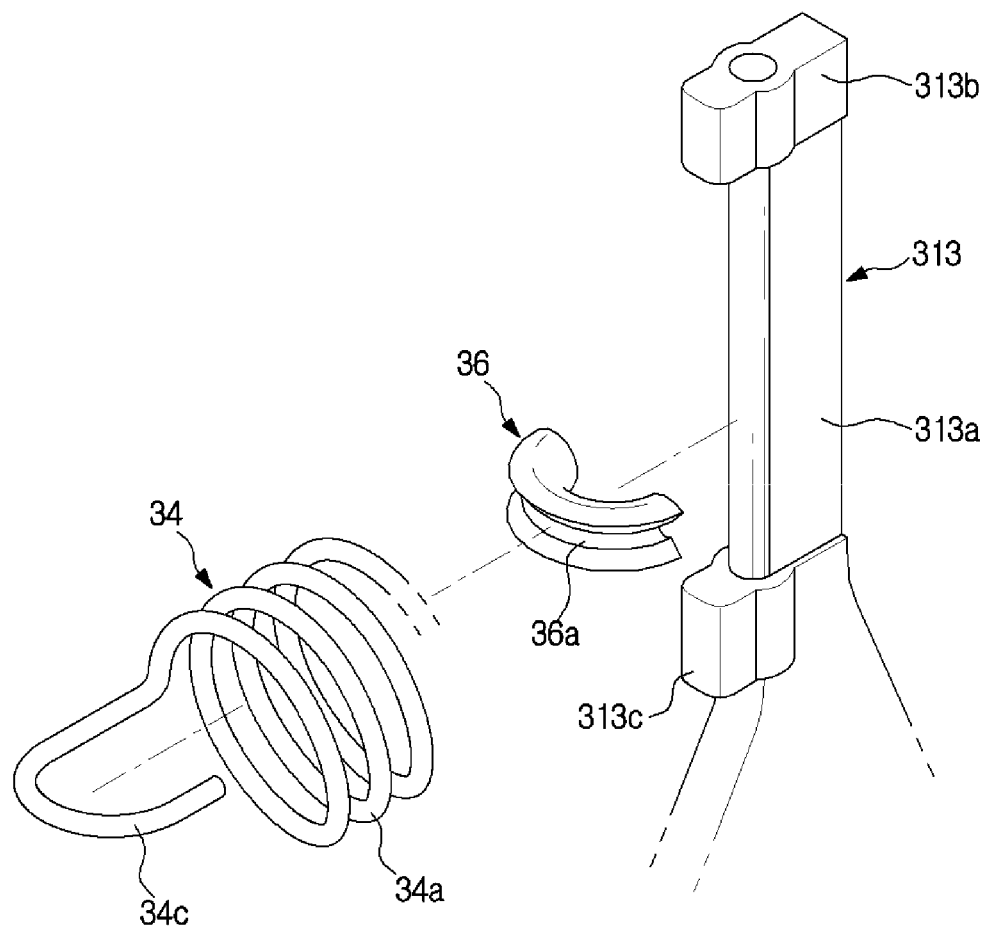
FIG. 7 is an exploded perspective view illustrating an installation state of a moving bush applied to the wheel assembly according to the first embodiment of the present disclosure.

Since the second hook 34c of the elastic member 34 is moveably installed at the above-described guide portion, the second hook 34c is supported by the guide portion 313a using a moving bush 36 as illustrated in FIG. 7 such that the second hook 34c is easily moved. The moving bush 36 is formed in a substantially arc shape, and a seating groove 36a on which the second hook 34c seats is provided in an outer circumferential surface of the moving bush 36.

Next, operations of the wheel assembly and the robot cleaner will be described in detail with reference to the accompanying drawings.

Figure 8:
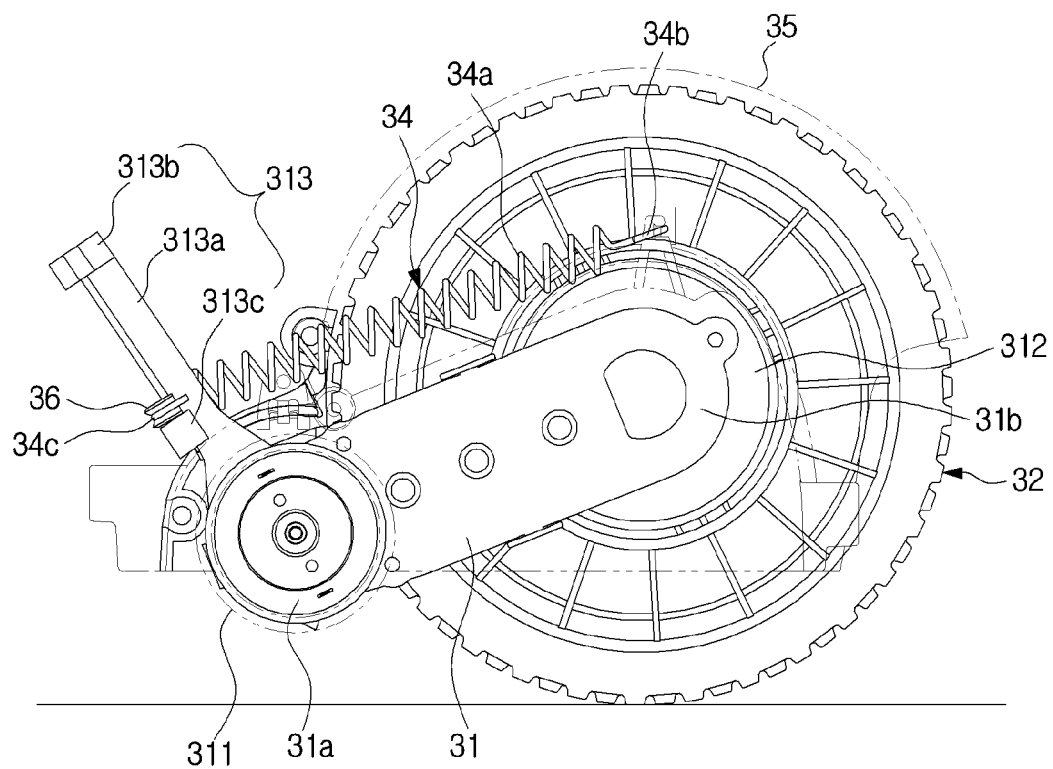
FIG. 8 is a side view illustrating the wheel assembly according to the first embodiment of the present disclosure.
Figure 9:
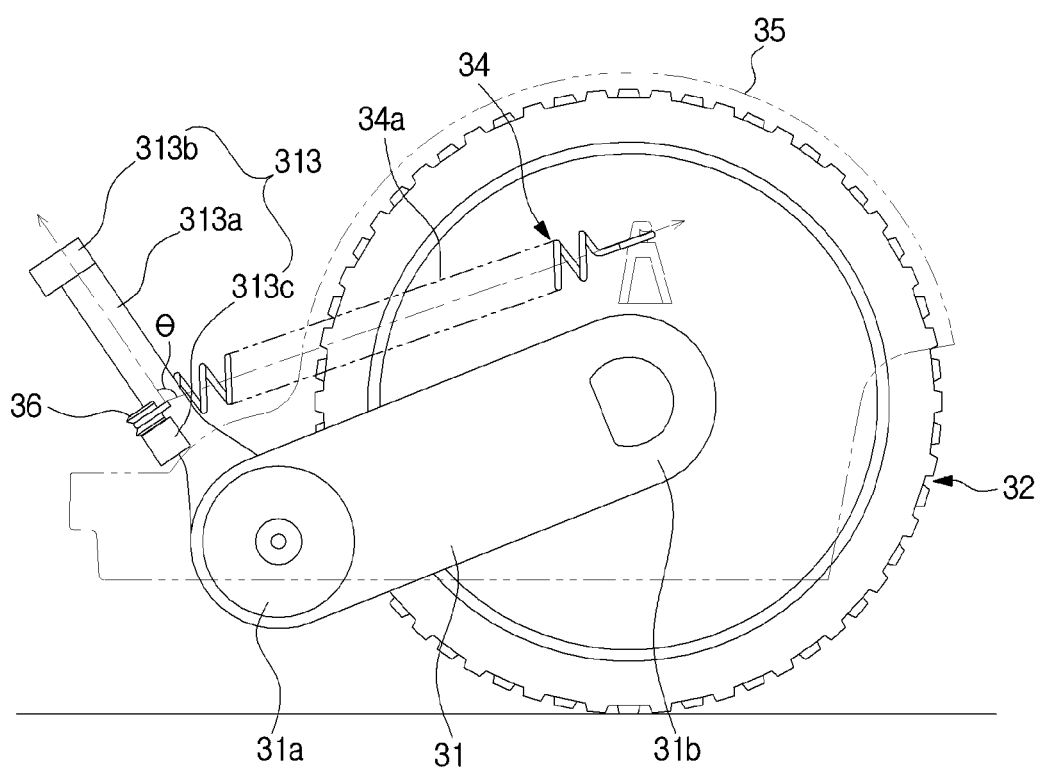
FIGS. 9 to 11 are operational states of the wheel assembly according to the first embodiment of the present disclosure.

As illustrated in FIGS. 8 and 9, in a case in which the robot cleaner 1 cleans a flat surface, since the weight of the robot cleaner 1 is directly transmitted to the drive wheel, a state in which the drive wheel 32 is accommodated in the wheel accommodation portion 35b of the wheel housing 35 is maintained without change.

In the above state, when the robot cleaner 1 passes a place such as a threshold having a height difference, the weight of the robot cleaner 1 transmitted to the drive wheel 32 decreases, and accordingly, the rotation arm 31 rotates about the first end portion 31a due to the elastic restoring force of the elastic member 34. The drive wheel 32 installed at the second end portion 31b of the rotation arm 31 is moved downward according to rotation of the rotation arm 31 and gradually protrudes downward from the wheel accommodation portion 35b.

Figure 10:
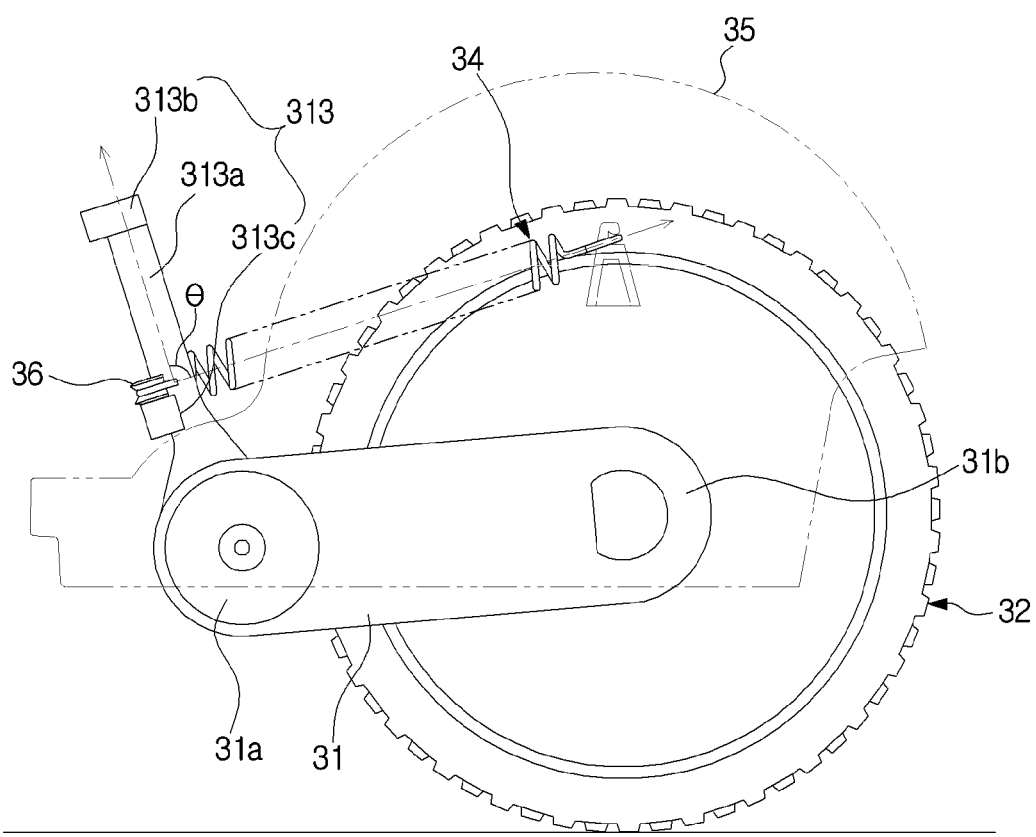
Figure 11:
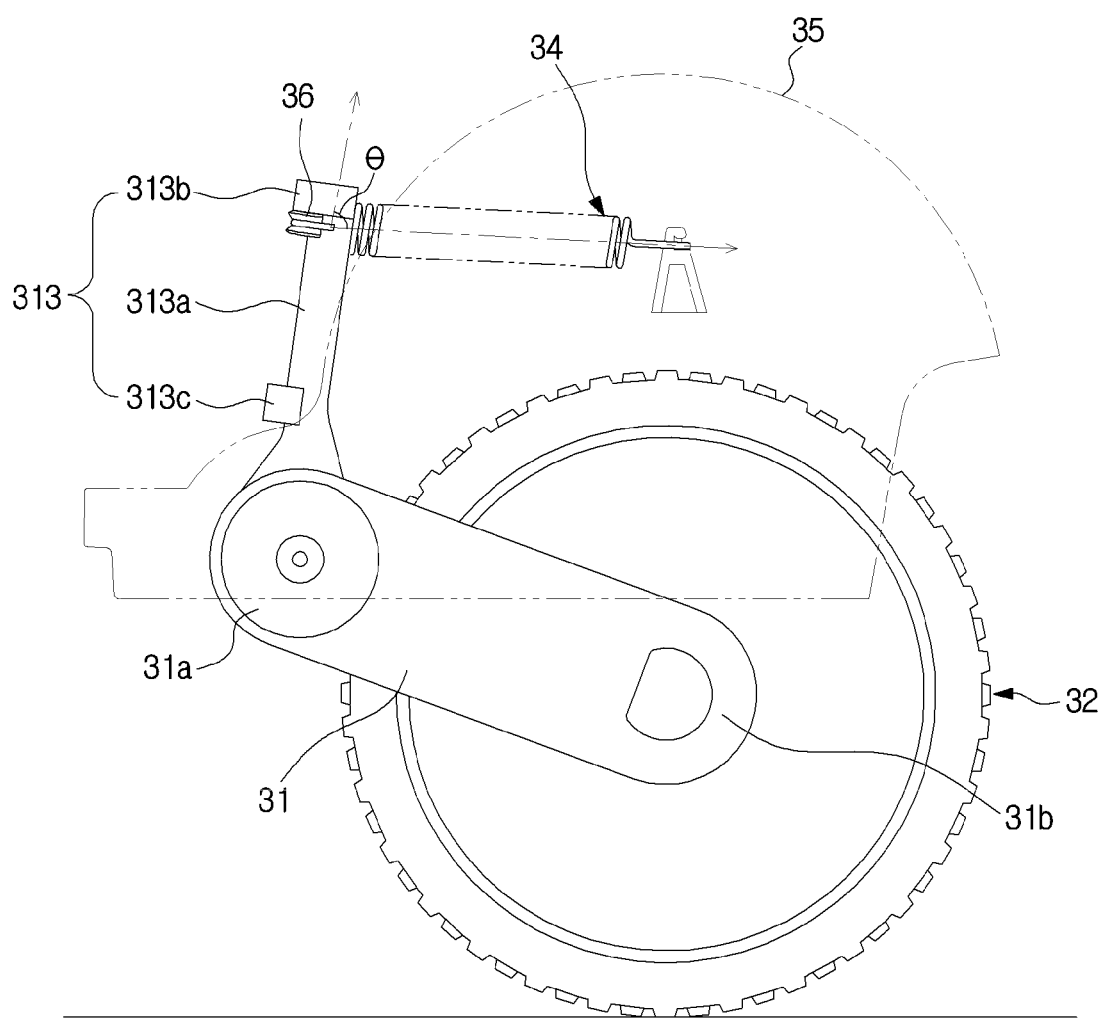

As described above, the guide 313 provided at the first end portion 31a of the rotation arm 31 is also rotated together with the rotation arm 31 according to the rotation of the rotation arm 31. As the rotation arm 31 is rotated, an angle θ between the guide portion 313a provided at the guide 313 and the elastic member 34 is changed from an obtuse angle, as illustrated in FIG. 9, to a right angle, as illustrated in FIG. 10, and is finally changed to an acute angle, as illustrated in FIG. 11, due to a restoring force of the elastic member 34. When the angle between guide portion 313a and the elastic member 34 is the acute angle, as described above, the moving bush 36 accordingly slides along a surface of the guide portion 313a and is moved upward to a position at which a right angle between the moving bush 36 and the guide 313 is maintainable. In addition, when the rotation arm 31 is continuously rotated, the moving bush 36 is continuously moved upward until the moving bush 36 is stopped due to the stopper 313b. When the rotation arm 31 is continuously rotated even after the moving bush 36 is supported by the upper stopper 313b, the angle between the guide portion 313a and the elastic member 34 is an acute angle, and such an angle decreases according to the rotation of the rotation arm 31.

When the second end 34c of the elastic member 34 is moved upward, since a position of the second end 34c elastically supported by the elastic member 34 is far from a rotation center of the rotation arm 31, a torque applied to the rotation arm 31 by the elastic member 34 is greater than that of a case in which the second end of the elastic member 34 is located below the guide portion 313a, and thus a contact force of the drive wheel 32 is increased. Accordingly, a reduction degree of the contact force of the drive wheel 32 according to the rotation of the rotation arm 31 is decreased by changing the position of the second end of the elastic member 34.

Figure 20:
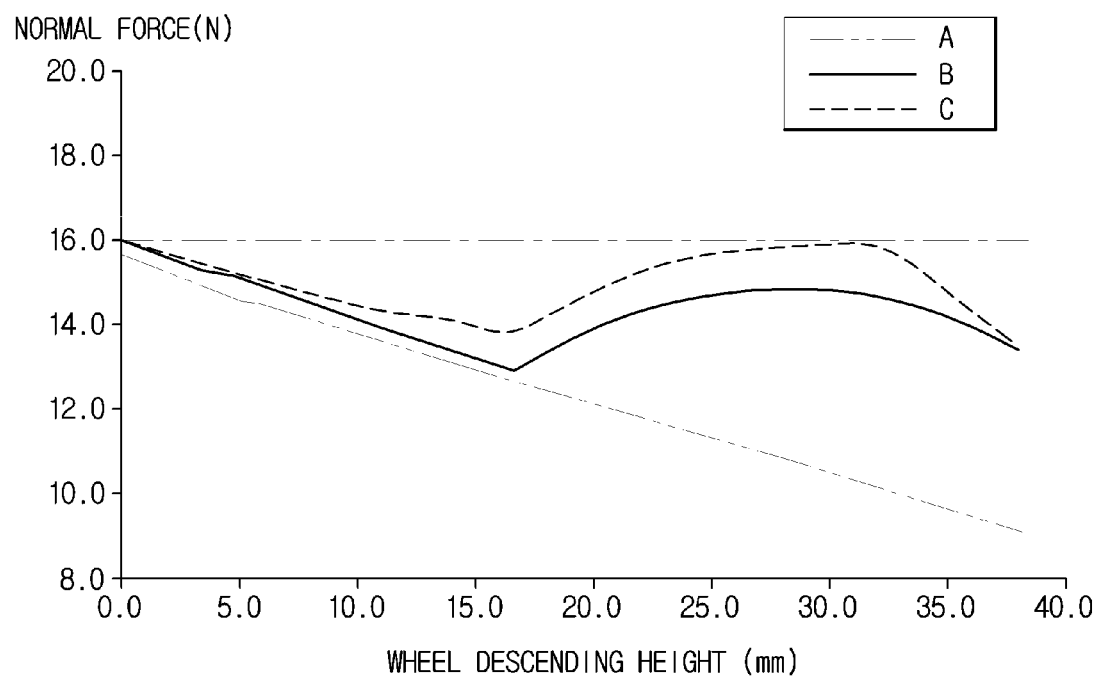
FIG. 20 is a graph illustrating normal force on a drive wheel according to embodiments of the present disclosure.

FIG. 20 is a graph showing a normal force applied to the drive wheel 32 when the second end 34c is moved below the drive wheel 32. In the drawing, line A shows a normal force applied to the drive wheel 32 in a case in which the second end is moved below the drive wheel 32 in a state in which the second end of the elastic member 34 is fixed like a conventional technology, and line B shows a normal force applied to the drive wheel 32 in a case in which the second end of the elastic member 34 is moved like the first embodiment of the present disclosure. Since the contact force of the drive wheel 32 is proportional to the normal force, a reduction degree of the contact force may be decreased by the second end of the elastic member 34 being moved as illustrated in the drawing.

Hereinafter, a wheel assembly according to a second embodiment of the present disclosure will be described in detail with reference to the accompanying drawings.

Figure 12:
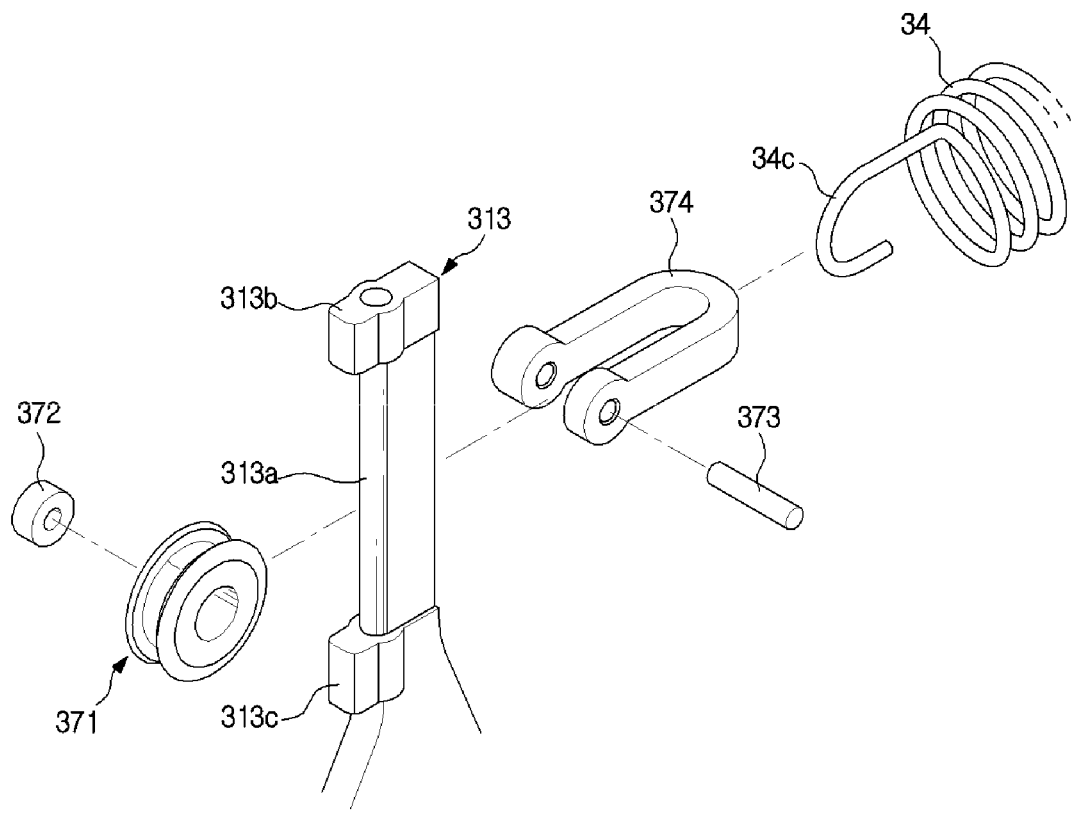
FIG. 12 is a perspective view illustrating an installation state of a roller and a holder applied to a wheel assembly according to a second embodiment of the present disclosure.
Figure 13:
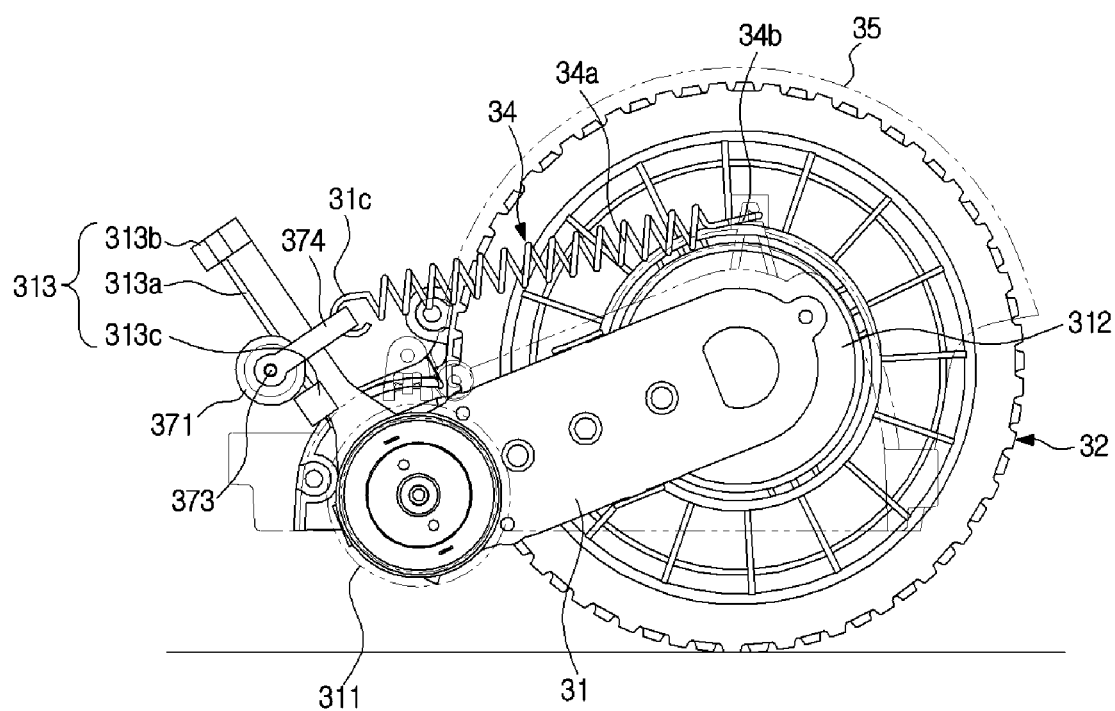
FIG. 13 is a side view illustrating the wheel assembly according to the second embodiment of the present disclosure.

As illustrated in FIGS. 12 and 13, a wheel assembly 30 according to the second embodiment of the present disclosure includes a drive wheel 32, a rotation arm 31, an elastic member 34, and a wheel housing 35 which have the same forms as those of the previous embodiment.

In addition, a second end of the elastic member 34 is moveably supported by a guide portion 313a through a roller 371 moveably installed at the guide portion 313a, a bearing 372 installed at a center of the roller 371, and a holder 374 formed in a U shape and having both ends coupled to a bearing 372 via a shaft 373. The second hook 34c of the elastic member 34 is supported by being hooked at a center of the holder 374. Due to the above configuration, the second end of the elastic member 34 may be more easily moved along the guide portion 313a.

Figure 14:
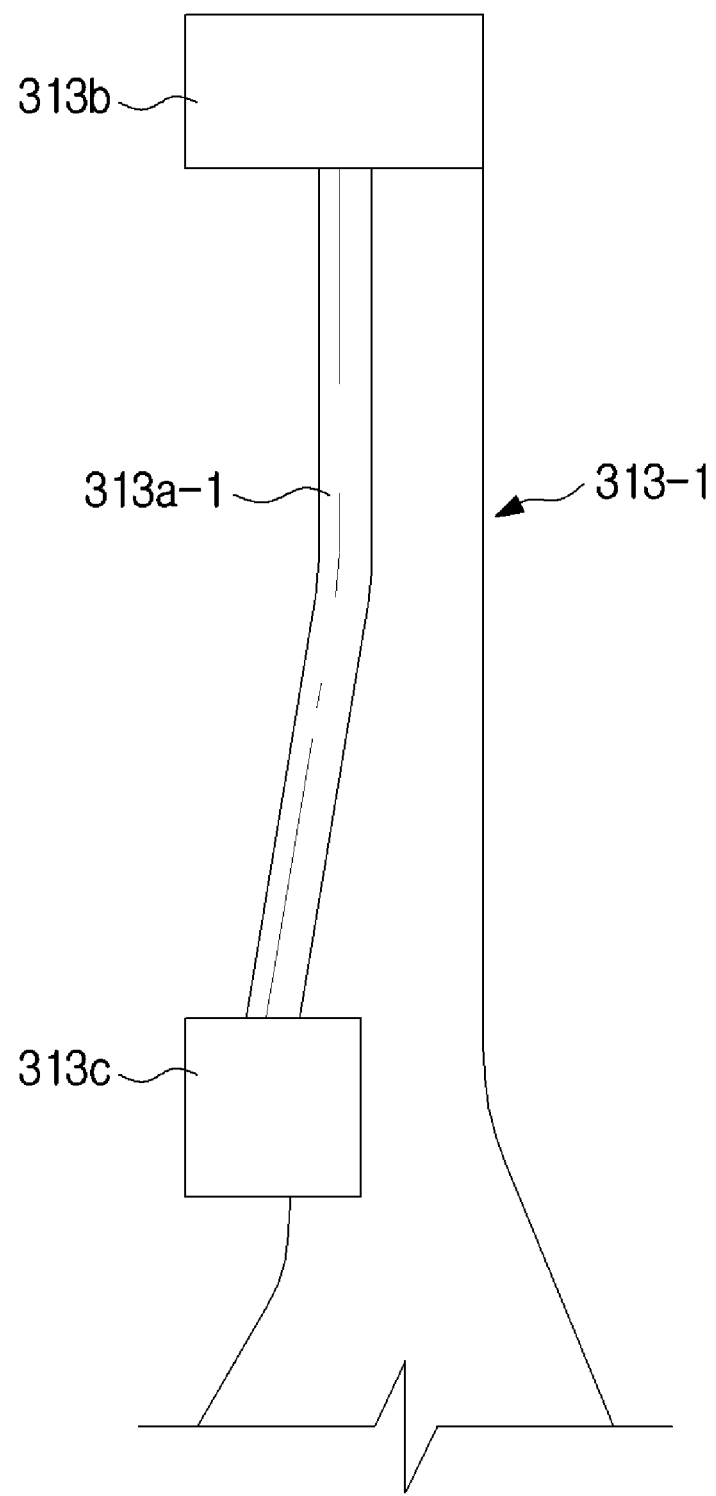
FIGS. 14 to 16 are side views illustrating various other types of guides applied to a wheel assembly according to the present disclosure.
Figure 15:
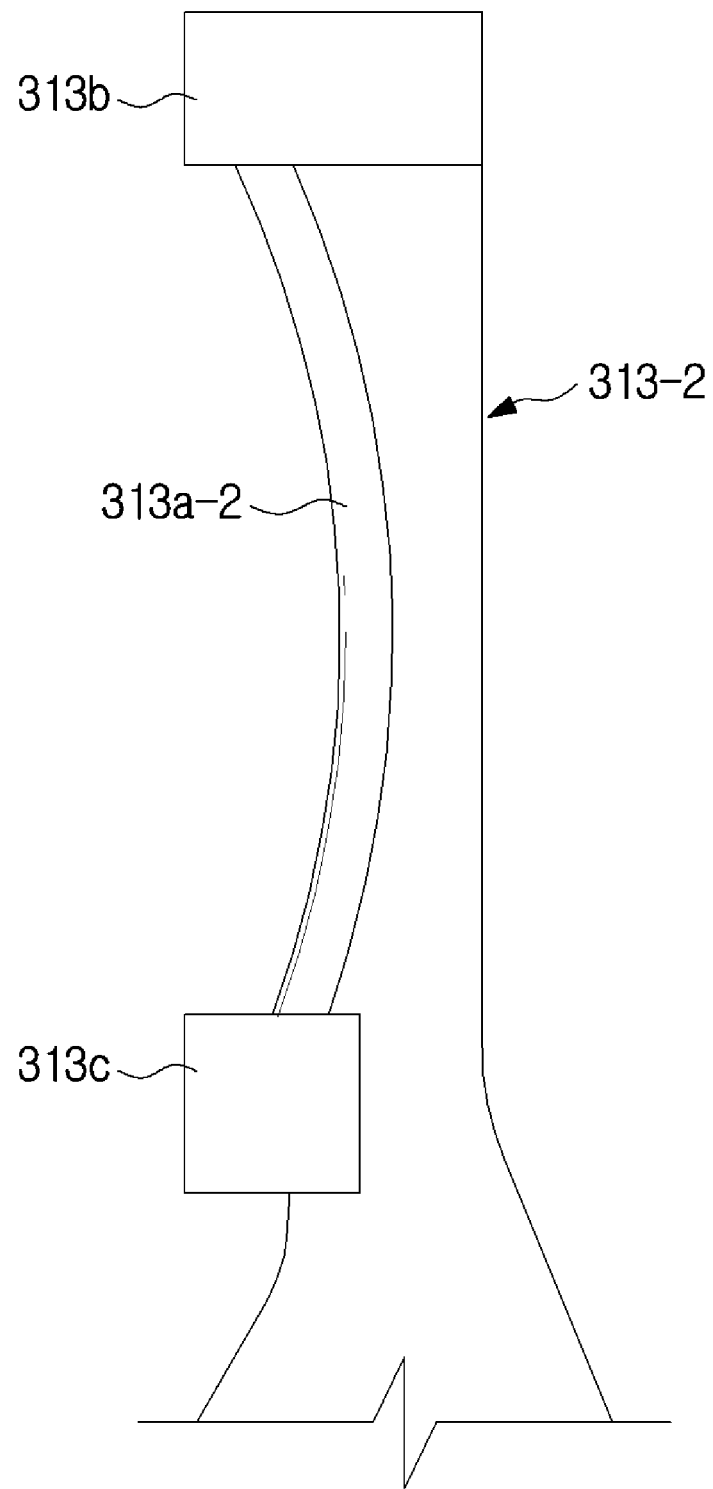
Figure 16:
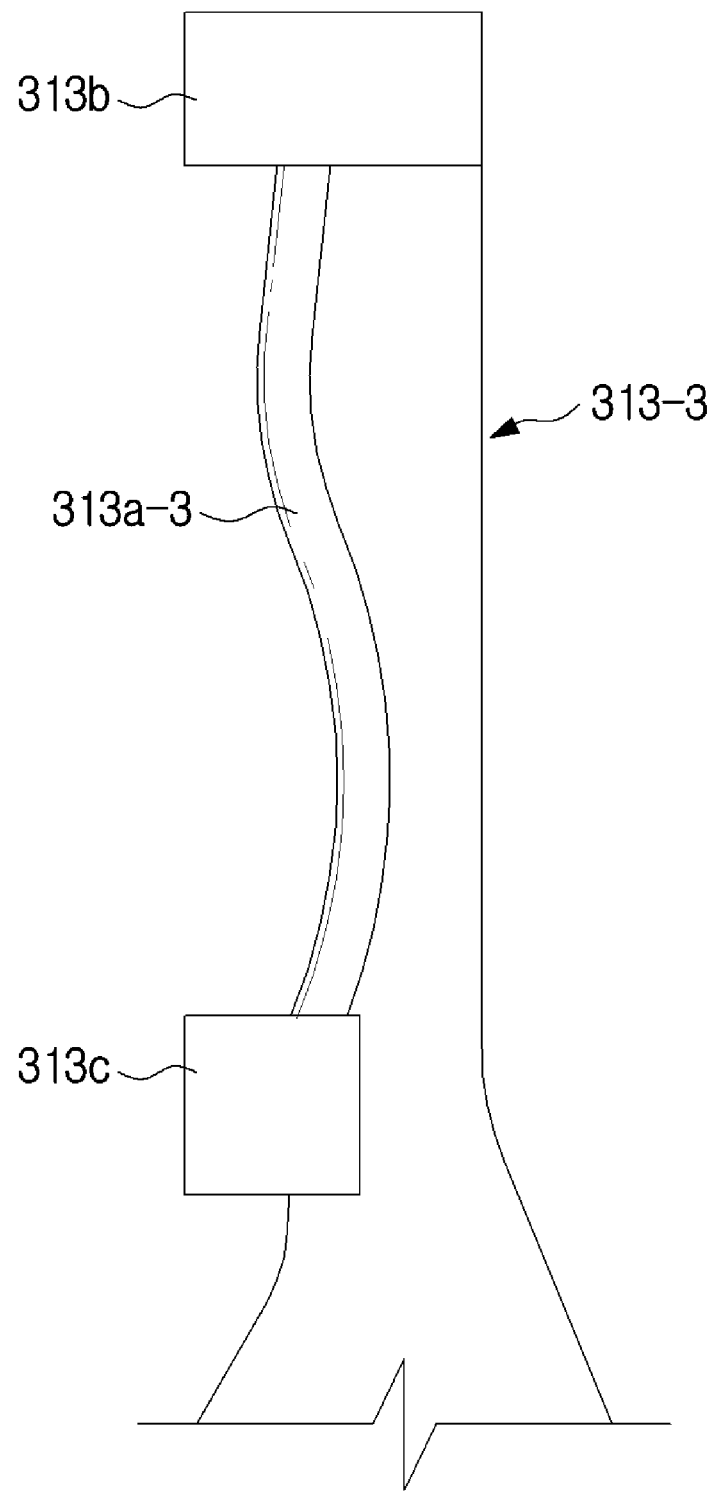

The guide portion 313a is formed in a linear shape in the above-described embodiments, but is not limited thereto. As illustrated in FIG. 14, a guide 313-1 may include a guide portion 313a-1 having two lines obliquely connected to form an obtuse angle, or, as illustrated in FIG. 15, a guide 313-2 may also include a guide portion 313a-2 formed in a concavely curved shape. In addition, as illustrated in FIG. 16, a guide 313-3 may also include a guide portion 313a-3 having a lower portion formed in a concavely curved shape and an upper portion having a convexly curved shape.

Hereinafter, a wheel assembly 30 according to a third embodiment of the present disclosure will be described in detail with reference to the accompanying drawings.

Figure 17:
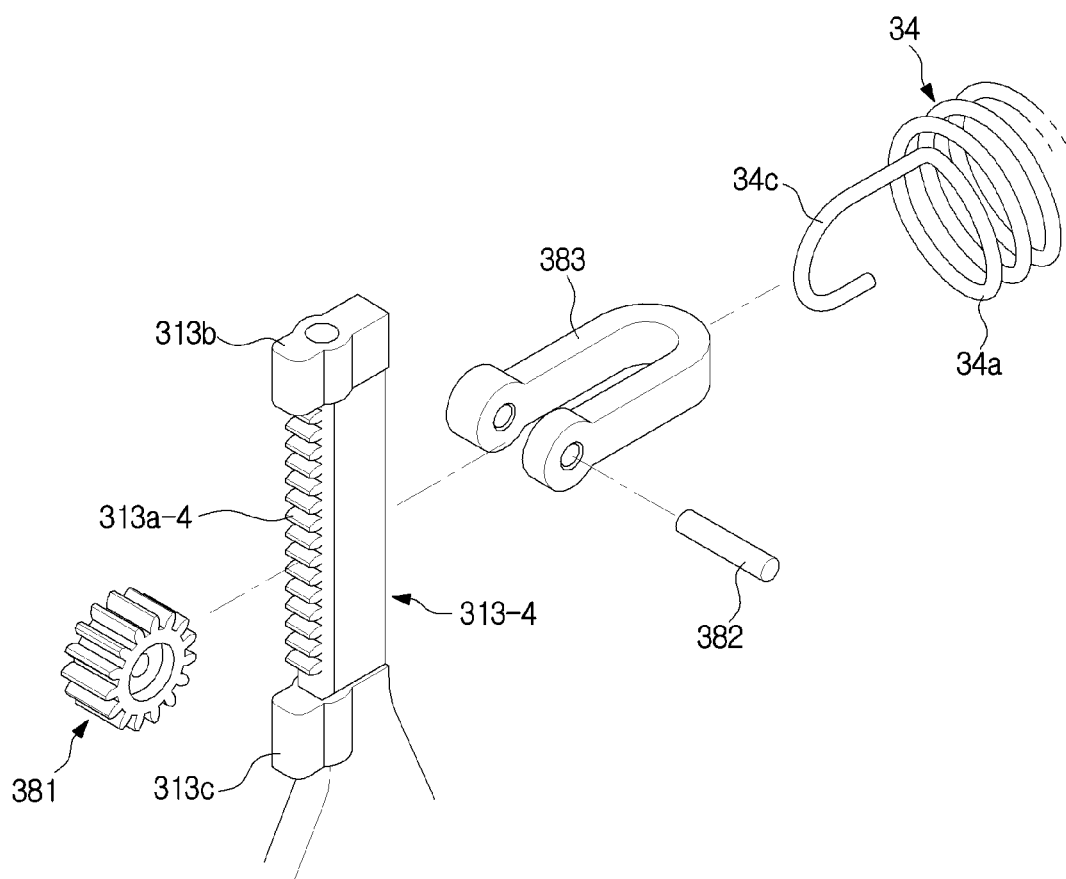
FIG. 17 is a perspective view illustrating the installation state of a pinion and a holder applied to a wheel assembly according to a third embodiment of the present disclosure.
Figure 18:
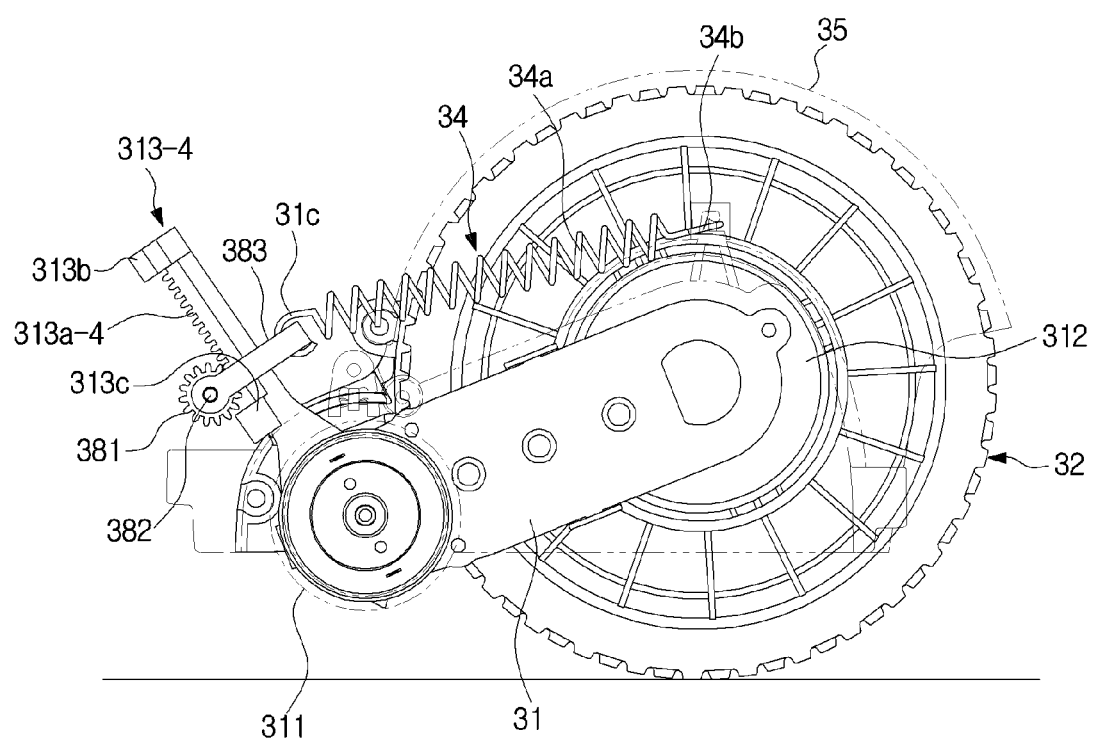
FIG. 18 is a side view illustrating the wheel assembly according to the third embodiment of the present disclosure.

As illustrated in FIGS. 17 and 18, the wheel assembly according to the third embodiment of the present disclosure includes a drive wheel 32, a rotation arm 31, an elastic member 34, and a wheel housing which have the same forms as those of the previous embodiment, and a guide 313-4 includes a guide portion 313a-4 formed in a rack gear form.

In addition, a second end of the elastic member 34 is moveably installed at a guide portion 313a through a pinion 381 tooth-engaged with the guide portion 313a-4 formed in the rack gear form and a holder 383 formed in a U shape and having both ends rotatably coupled to the pinion 381 by a shaft 382. A second hook 34c of the elastic member 34 is supported by being hooked at a center of the holder 383. Due to the above configuration, the second end of the elastic member 34 may be more easily moved along the guide portion 313a-4.

Line C of FIG. 20 shows a normal force of the drive wheel 32 according to a structure in which the second end of the elastic member 34 may be moved by the guide portion 313a formed in the rack gear form and the pinion 381.

Figure 19:
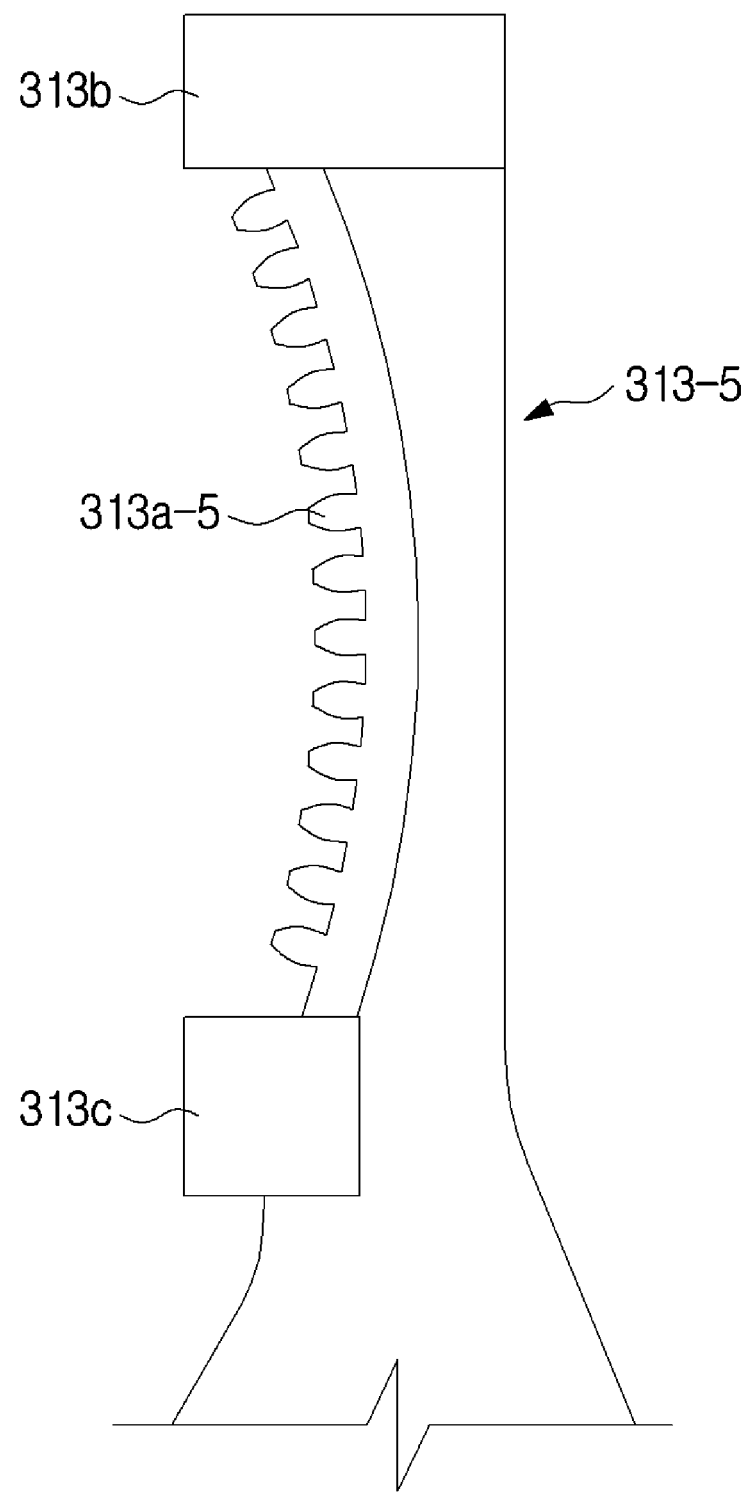
FIG. 19 is a side view illustrating another type of guide that can be applied to the third embodiment of the present disclosure.

In the embodiment, the guide portion 313a includes a rack gear in a linear shape, but is not limited thereto, and, as illustrated in FIG. 19, a guide 313-5 may also include a guide portion 313a-5 formed in an inner rack gear form.

Although the second end of the elastic member having the structure in which the second end is vertically moveably installed in the above-described embodiments, the embodiments are not limited thereto, and a first end of an elastic member installed at a side of a main body may also be moveable upward and downward.

In addition, in the above-described embodiments, the wheel assembly is installed in the robot cleaner 1 and the robot cleaner 1 moves, but the embodiments are not limited thereto, and the wheel assembly may also be applied to various moving objects other than the robot cleaner. That is, the wheel assembly may also be applied to various different kinds of moving robots, vehicles, and the like other than the robot cleaner.

Although the spirit of the present disclosure has been disclosed on the basis of the various embodiments as described above, the scope of the present disclosure is not limited to the embodiments. Various other embodiments that may be changed or modified by those skilled in the art without departing from the scope and spirit of the present disclosure defined by the appended claims fall within the scope of the present disclosure.

The invention claimed is:

1. A robot cleaner comprising:
a main body; and
a wheel assembly coupled to the main body and configured to guide movement of the main body;
wherein the wheel assembly includes:
a drive wheel;
a rotation arm including a first portion rotatably coupled to the main body, a second portion to which the drive wheel is rotatably coupled, and a guide extending from the second portion of the rotation arm, the guide having first and second ends and a sliding portion between the first and second ends, the first end being closer to the first portion of the rotation arm which is rotatably coupled to the main body, than the second end; and
an elastic member including a first end coupled to the main body and a second end opposite to the first end, the second end coupled to the sliding portion of the guide and configured to slide on the sliding portion of the guide between the first and second ends of the guide so as to be moveable along the sliding portion of the guide.

2. The robot cleaner of claim 1, wherein
the guide is configured to vertically extend from the first rotation shaft.

3. The robot cleaner of claim 2, wherein the guide includes
a pair of stoppers provided at upper and lower ends of the sliding portion and configured to restrict vertical movement of the second end of the elastic member.

4. The robot cleaner of claim 3, wherein the sliding portion is formed in a linear shape.

5. The robot cleaner of claim 3, wherein the sliding portion includes two line sections obliquely connected to form an obtuse angle.

6. The robot cleaner of claim 3, wherein the sliding portion is formed in a concavely curved shape.

7. The robot cleaner of claim 3, wherein the elastic member includes:
an elastic portion formed in a coil form;
a first hook supported by the main body; and
a second hook supported by the sliding portion.

8. The robot cleaner of claim 7, further comprising a roller moveably installed on the sliding portion,
wherein the second hook is connected to the roller.

9. The robot cleaner of claim 8, further comprising:
a bearing installed at a center of the roller; and
a holder including both ends of the holder coupled to the bearing by a shaft,
wherein the second hook is supported by the holder.

10. The robot cleaner of claim 7, further comprising a moving bush formed in an arc shape and moveably installed at the sliding portion, wherein the moving bush includes a seating groove which is provided in a circumferential direction and in which the second hook is seated.

11. The robot cleaner of claim 10, further comprising:
a pinion moveably installed on the sliding portion formed as a rack gear; and
a holder having both ends coupled to the pinion by a shaft, wherein the second hook is supported by the holder.

12. The robot cleaner of claim 11, wherein the sliding portion is formed in an inner gear form.

13. The robot cleaner of claim 1, wherein the wheel assembly is provided with a pair of wheel assemblies coupled to both sides of the main body.

14. A method of operating a wheel assembly including a rotation arm having a first portion rotatably coupled to a moving object, a second portion, and a guide extending from the second portion of the rotation arm, a drive wheel rotatably coupled to the second portion of the rotation arm opposite the first portion, and an elastic member having a first end coupled to the moving object and having a second end disposed opposite the first end, the guide having first and second ends and a sliding portion between the first and second ends, the first end being closer to the first portion of the rotation arm which is rotatably coupled to the main body, than the second end, the second end of the elastic member coupled to the sliding portion of the guide and configured to slide on the sliding portion of the guide between the first and second ends of the guide, so as to be moveable with respect to the rotation arm, the method comprising:
rotating the rotation arm about the first portion of the rotation arm;
moving the drive wheel disposed at the second portion of the rotation arm downward; and
sliding the second end of the elastic member upward on the sliding portion of the guide between the first and second ends of the guide based on a downward movement of the drive wheel.

15. The method of claim 14, wherein:
the guide is configured to guide the movement of the second end of the elastic member; and
an angle between the elastic member and the guide is gradually changed from an obtuse angle to an acute angle according to the downward movement of the drive wheel.

* * * * *